United States Patent
Tachibana et al.

(10) Patent No.: US 8,733,492 B2
(45) Date of Patent: May 27, 2014

(54) POWER UNIT SUSPENSION STRUCTURE FOR ELECTRIC VEHICLE

(75) Inventors: Yuichi Tachibana, Shizuoka-ken (JP); Akihiro Nishikawa, Shizuoka-ken (JP); Shuichi Yamane, Shizuoka-ken (JP); Sunao Wakatsuki, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 13/372,790

(22) Filed: Feb. 14, 2012

(65) Prior Publication Data

US 2012/0211298 A1 Aug. 23, 2012

(30) Foreign Application Priority Data

Feb. 23, 2011 (JP) .................. 2011-036898

(51) Int. Cl.
*B60K 1/00* (2006.01)

(52) U.S. Cl.
USPC ........... 180/299; 180/291; 180/292; 180/297; 180/65.22; 180/312; 296/203.04

(58) Field of Classification Search
USPC ........ 180/299, 300, 291, 232, 292, 297, 65.1, 180/65.21, 65.22, 312; 248/581, 634–638; 296/193.07, 193.08, 204, 203.04
See application file for complete search history.

(56) References Cited

U.S. PATENT DOCUMENTS

| | | | | |
|---|---|---|---|---|
| 1,648,875 A | * | 11/1927 | Griese | 180/298 |
| 1,664,040 A | * | 3/1928 | Masury et al. | 180/291 |
| 3,468,389 A | * | 9/1969 | Nelson | 180/65.6 |
| 5,915,495 A | * | 6/1999 | Kerlin et al. | 180/291 |
| 6,679,523 B2 | * | 1/2004 | Yamamoto et al. | 280/785 |
| 6,973,982 B2 | | 12/2005 | Yoshikawa et al. | |
| 7,118,168 B2 | * | 10/2006 | Vincenti | 296/203.04 |
| 7,497,691 B2 | | 3/2009 | Urano | |
| 2005/0104356 A1 | * | 5/2005 | Vincenti | 280/795 |
| 2008/0078603 A1 | * | 4/2008 | Taji et al. | 180/312 |
| 2010/0101885 A1 | * | 4/2010 | Nozaki et al. | 180/232 |

FOREIGN PATENT DOCUMENTS

| | | |
|---|---|---|
| CN | 101152835 A | 4/2008 |
| CN | 101641251 A | 2/2010 |
| EP | 1 188 643 A1 | 3/2002 |
| JP | 02037085 A * 2/1990 | ............. B62D 25/08 |

(Continued)

OTHER PUBLICATIONS

Office Action for Chinese Application No. 201210042755.9 dated Mar. 4, 2014.

*Primary Examiner* — J. Allen Shriver, II
*Assistant Examiner* — Steve Clemmons
(74) *Attorney, Agent, or Firm* — Alston & Bird LLP

(57) ABSTRACT

A power unit 4 is mounted in a rear part of a vehicle, a shaft C shared by a motor 2 and a motor speed reducer 3 is disposed in a vehicle width direction, and a sub-frame 8 is provided around the power unit 4, a front cross frame 11 is disposed over a front portion of the power unit 4 in a front view of the vehicle and disposed in parallel with the shaft C of the motor 2, a rear cross frame 12 is disposed over a side portion of the power unit 4 in a side view of the vehicle, and left and right side portions of the power unit 4 are suspended from a vehicle body via suspension brackets 13 and 14 provided on side frames 9 and 10, circular mount rubbers 15 and 16, and motor-side mount brackets 17 and 18.

2 Claims, 4 Drawing Sheets

(56) References Cited

FOREIGN PATENT DOCUMENTS

| JP | 05077765 | A | * | 3/1993 | ............. | B62D 21/11 |
| JP | 2001105893 | A | * | 4/2001 | ............... | B60K 1/04 |
| JP | 2003-072392 | A | | 3/2003 | | |
| JP | 2008-195259 | A | | 8/2008 | | |
| JP | 2008-222032 | A | | 9/2008 | | |
| JP | 2009-227083 | A | | 10/2009 | | |

* cited by examiner

POWER UNIT SUSPENSION STRUCTURE FOR ELECTRIC VEHICLE

CROSS-REFERENCE TO RELATED APPLICATIONS

The present application claims priority to Japanese Patent Application No. 2011-036898 filed Feb. 23, 2011.

BACKGROUND OF THE INVENTION

1. Field of the Invention

The present invention relates to a suspension structure for a power unit mounted in a rear part of an electric vehicle.

2. Description of Related Art

In recent years, electric vehicles (EVs) that run with a drive force of a motor (electric motor) have been provided along with vehicles having a gasoline engine in consideration of the global environment. A power unit including the motor and a motor speed reducer is mounted in a rear part of the electric vehicle.

Since such a power unit has a relatively large capacity and weight, a conventional electric vehicle includes a special structure with high rigidity in a lower part of a vehicle body, such as on a rear floor, to suspend the power unit (for example, see JP 4508260 B, JP 2008-222032 A, JP 2008-195259 A, and JP 2003-72392 A). As an example, a frame for suspending a power unit in a lower part of the vehicle body is provided around the power unit.

However, in the structure for suspending the power unit in the conventional electric vehicle described above, relative positions of the power unit, the frame, and the vehicle body, and a position of a suspension portion of the power unit from the vehicle body are not determined with sufficient consideration of loads generated in a vertical direction, a width direction, and a front-back direction of the vehicle when running, and a rotating load in the vertical direction of the vehicle due to torque variations of the motor during driving or deceleration. Thus, the loads cannot be efficiently absorbed, and propagation of vibrations to the vehicle body cannot be reduced.

In conventional suspension structures, when a front impact load or a rear impact load is applied to the vehicle, and the load cannot be efficiently absorbed, a rubber bush in the suspension portion of the power unit from the vehicle body may break, or the power unit may be brought into contact with a structure in a front part of the vehicle.

Furthermore, in conventional suspension structures, when a lateral impact load is applied to the vehicle, a structure in a side part of the vehicle is easily brought into contact with the power unit, and a high voltage cable of the motor and a motor electrode terminal may break.

SUMMARY OF THE INVENTION

The present invention was achieved in view of such circumstances, and it has as an object to provide a power unit suspension structure for an electric vehicle that can efficiently absorb loads generated in a vertical direction, a width direction, and a front-back direction of the vehicle when running, and a rotating load around a motor shaft due to torque variations of a motor during driving or deceleration, reduce vibration of a power unit to reduce propagation of vibration to a vehicle body, reduce contact between the power unit and surrounding structures, and prevent breakage of a high voltage cable of the motor and a motor electrode terminal.

To solve the problems in the conventional techniques, the present invention provides a power unit suspension structure for an electric vehicle in which a power unit including a motor and a motor speed reducer is mounted in a rear part of the vehicle, a shaft shared by the motor and the motor speed reducer is disposed in a vehicle width direction, and a frame for suspending the power unit from a vehicle body is provided around the power unit, wherein a front portion of the frame extending in the vehicle width direction is disposed over a front portion of the power unit in a front view of the vehicle and disposed in parallel with the shaft of the motor, a side portion of the frame extending in a vehicle front-back direction is disposed over a side portion of the power unit in a side view of the vehicle, and left and right side portions of the power unit are suspended from the vehicle body via a suspension bracket provided on the side portion of the frame, a circular mount rubber having a center on an extending line of the shaft of the motor, and a motor-side mount bracket.

In the present invention, a rear portion of the frame extending in the vehicle width direction is disposed in an upper part of the vehicle with respect to the front portion and the side portion of the frame, and includes an inclined portion extending upward of the vehicle, and a suspension portion suspended from the vehicle body.

Furthermore, in the present invention, a motor-side mount bracket is disposed on the inclined portion in the rear portion of the frame, extending upward of the vehicle from one side of the frame, or on one side portion of the frame, and is disposed overlapping an electrode wire portion of the motor in a side view of the vehicle.

In the present invention, a rear floor around the power unit has a front portion, a rear portion higher than the front portion, and a slope portion provided between the front portion and the rear portion and extending upward toward the rear part of the vehicle, and the front portion of the power unit is suspended from the front portion or the slope portion of the rear floor.

Furthermore, in the present invention, a center of the power unit in the vehicle width direction on a vehicle front side of the power unit is suspended from the front portion of the frame at the same height position as a center of the shaft of the motor, and a vehicle rear side of the power unit is suspended via a longitudinal bracket from the vehicle body in the rear part of the vehicle with respect to the frame.

In the present invention, a mounting bracket is provided in a vehicle body suspension portion on the vehicle rear side of the power unit, close to a connecting portion of a support member of a lateral rod near a crossing portion of a first reinforcing member extending in the vehicle width direction and a second reinforcing member extending in the vehicle front-back direction.

In the present invention, there are two or more vehicle body suspension points on the rear portion of the frame in the vehicle width direction with the center of the power unit therebetween, at least two of the vehicle body suspension points are offset in the vehicle front-back direction, the point on the side with the support member of the lateral rod is located in the rear part of the vehicle, and one, with the support member of the lateral rod, of left and right L-shaped vertical portions located near the inclined portion in the rear portion of the frame is disposed in the rear part of the vehicle.

As described above, according to the present invention, the power unit suspension structure for an electric vehicle provides the power unit suspension structure for an electric vehicle in which the power unit including the motor and the motor speed reducer is mounted in the rear part of the vehicle, the shaft shared by the motor and the motor speed reducer is disposed in the vehicle width direction, and the frame for suspending the power unit from the vehicle body is provided around the power unit, wherein the front portion of the frame extending in the vehicle width direction is disposed over the front portion of the power unit in a front view of the vehicle and disposed in parallel with the shaft of the motor, the side portion of the frame extending in the vehicle front-back direction is disposed over the side portion of the power unit in a side view of the vehicle, and the left and right side portions of the power unit are suspended from the vehicle body via the suspension bracket provided on the side portion of the frame, the circular mount rubber having the center on the extending line of the shaft of the motor, and the motor-side mount bracket. Thus, the following advantages can be obtained.

Specifically, according to the power unit suspension structure of the present invention, loads to the power unit generated in the vertical direction, the width direction and the front-back direction of the vehicle when running can be suspended at left and right suspension portions with the shaft of the motor therebetween, and can be received by the side portion of the frame extending near the power unit.

Thus, the loads on the suspension portion of the power unit in the suspension structure of the present invention are mainly in the vertical direction, width direction, and front-back direction of the vehicle, thereby reducing irregular deformation to twist a circular surface of the circular mount rubber. This can increase absorbing efficiency of the loads, reduce propagation of vibrations to the vehicle body based on vibration of the power unit, and increase the life of the circular mount rubber.

According to the power unit suspension structure of the present invention, a rotating load around the motor shaft due to torque variations of the motor during driving or deceleration is absorbed by the twisting of the circular surface of the circular mount rubber. This can efficiently absorb the rotating load.

Furthermore, according to the power unit suspension structure of the present invention, even when a front impact load or a rear impact load is applied to the vehicle, the load is a force compressing the circular mount rubber. This can efficiently absorb the impact load, prevent breakage of the mount rubber or the like in the suspension portion of the power unit from the vehicle body, and the front portion of the frame reduces contact between the power unit and the structure in the front part of the vehicle.

On the other hand, in the present invention, the rear portion of the frame extending in the vehicle width direction is disposed in the upper part of the vehicle with respect to the front portion and the side portion of the frame, and includes the inclined portion extending upward of the vehicle, and the suspension portion suspended from the vehicle body. The frame generally has a substantially L-shape in a side view of the vehicle, deformation of an L-shaped bent portion can absorb vibration from the power unit. This can reduce vibration of the power unit, and reduce noise inside the cabin.

In the present invention, the motor-side mount bracket is disposed on the inclined portion in the rear portion of the frame, extending upward of the vehicle from one side of the frame, or on one side portion of the frame, and disposed over the electrode wire portion of the motor in a side view of the vehicle. Thus, the motor-side mount bracket can reduce exposure of the motor electrode terminal, prevents direct contact between the structure in the side part of the vehicle and the power unit when a lateral impact load is applied to the vehicle, and reduce breakage of the high voltage cable of the motor and the motor electrode terminal.

Furthermore, in the present invention, the rear floor around the power unit includes the front portion, the rear portion higher than the front portion, and the slope portion provided between the front portion and rear portions and extending upward toward the rear part of the vehicle, and the front portion of the power unit is suspended from the front portion or the slope portion of the rear floor. Thus, the frame having substantially an L-shape in a side view of the vehicle and the stepped rear floor form a rectangular shape in a side view of the vehicle, thereby increasing suspension rigidity of the power unit.

In the present invention, the center of the power unit in the vehicle width direction on the vehicle front side of the power unit is suspended from the front portion of the frame at the same height position as the center of the shaft of the motor, and the vehicle rear side of the power unit is suspended via the longitudinal bracket from the vehicle body in the rear part of the vehicle with respect to the frame. This can efficiently absorb oscillation and a rotating load around the motor shaft generated during driving or deceleration of the motor. Also, only the vehicle rear side of the power unit is suspended from the vehicle body rather than the frame. Thus, the rigidity of the vehicle body can prevent large oscillations of the power unit, and when a load is applied to the vehicle from the rear, the load is applied to the vehicle body earlier than to the frame, thereby delaying a load on the power unit due to removal of the longitudinal bracket or the like.

As a result, the frame structure can be disposed with reference to the motor shaft of the power unit to determine the suspension positions. This allows the load to be received by each of the suspension portions, and achieves efficient load absorption.

Furthermore, in the present invention, the mounting bracket is provided in the vehicle body suspension portion on the vehicle rear side of the power unit, close to the connecting portion of the support member of the lateral rod near the crossing portion of the first reinforcing member extending in the vehicle width direction and the second reinforcing member extending in the vehicle front-back direction. This can increase rigidity of the vehicle body suspension portion, and provide the same advantage as the invention described above.

In the present invention, there are two or more vehicle body suspension points on the rear portion of the frame in the vehicle width direction with the center of the power unit therebetween, at least two of the vehicle body suspension points are offset in the vehicle front-back direction, the point on the side with the support member of the lateral rod is located in the rear part of the vehicle, and one, with the support member of the lateral rod, of left and right L-shaped vertical portions located near the inclined portion in the rear portion of the frame is disposed in the rear part of the vehicle. Thus, when the impact load is applied to the vehicle from the rear, the load is first applied to a portion on the side opposite to the high voltage terminal of the motor, thereby delaying movement of the high voltage terminal forward of the vehicle.

Therefore, according to the suspension structure of the present invention, contact between the high voltage terminal and a component in front of the high voltage terminal can be reduced to reduce breakage of the high voltage terminal.

DETAILED DESCRIPTION OF PREFERRED EMBODIMENTS

Figure 1:
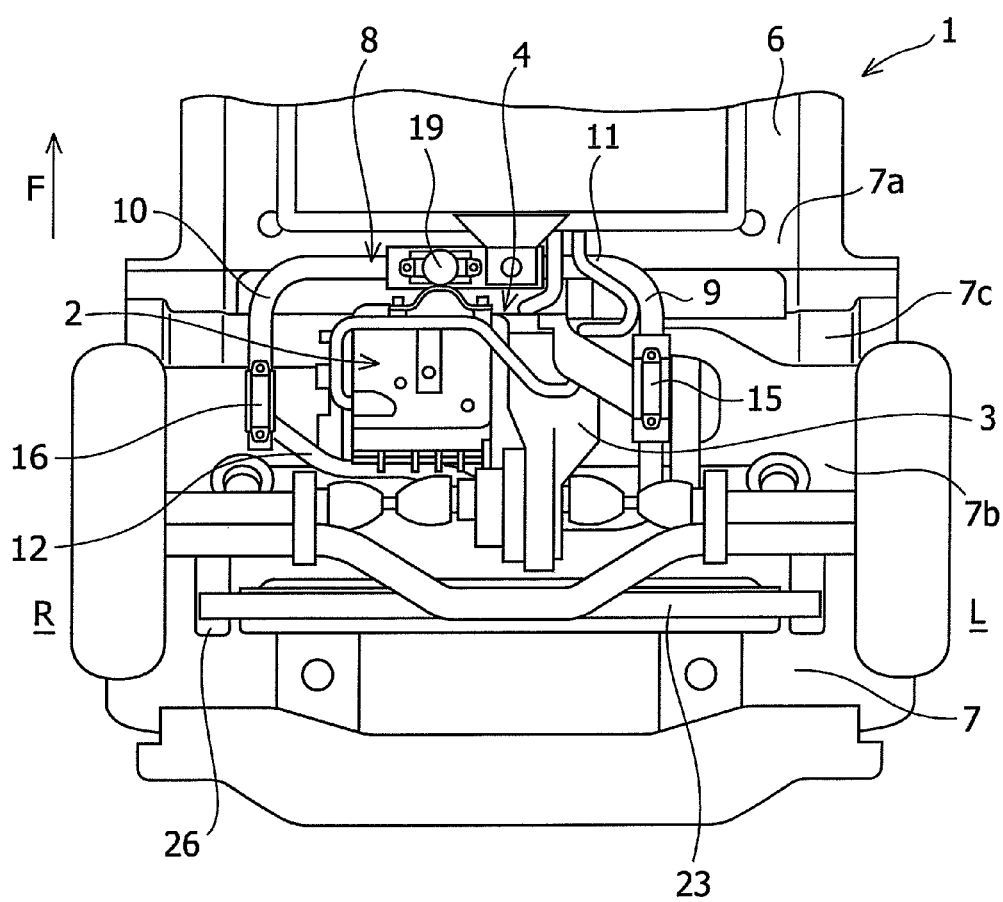
FIG. 1 is a perspective view, seen from below a vehicle, of a state in which a power unit is suspended in a rear part of a vehicle body to which a power unit suspension structure for an electric vehicle according to an embodiment of the present invention is applied.

Now, the present invention will be described in detail based on a shown embodiment.

FIGS. 1 to 5 show a power unit suspension structure for an electric vehicle according to an embodiment of the present invention.

A vehicle to which the power unit suspension structure according to the embodiment of the present invention is applied is an electric vehicle 1. The electric vehicle 1 is a rear drive vehicle such as a commercial vehicle, and runs with a drive force of a motor (electric motor) to which power is supplied. As shown in FIGS. 1 to 5, a power unit 4 including a motor 2 and a motor speed reducer 3 is mounted in a rear part of the electric vehicle 1. A shaft C shared by the motor 2 and the motor speed reducer 3 is disposed in a vehicle width direction.

The power unit 4 is configured such that the motor speed reducer 3 is connected to a left side of the motor 2 in the vehicle width direction, and a longitudinal direction thereof is in the vehicle width direction. As shown in FIG. 4, a battery pack 5 that supplies power to the motor 2 is disposed in front of the power unit 4 in the vehicle. In FIGS. 1 to 5, an arrow F shows the front of the vehicle, reference character L denotes the left of the vehicle, and reference character R denotes the right of the vehicle.

In a lower part of a vehicle body of the electric vehicle 1 in this embodiment, a front floor 6 in the front part of the vehicle and a rear floor 7 in the rear part of the vehicle, connected to the front floor 6 are provided to extend in a vehicle front-back direction and the vehicle width direction. A sub-frame (frame) 8 for supporting the power unit 4 on the rear floor 7 of the vehicle body for suspension is provided below the rear floor 7.

As shown in FIGS. 1 and 3 to 5, the rear floor 7 includes a front portion 7a, a rear portion 7b one step higher than the front portion 7a, and a slope portion 7c provided between the front portion 7a and the rear portion 7b and gently sloping upward toward the rear part of the vehicle, and generally has a stepped shape in a side view of the vehicle. A front portion of the power unit 4 is suspended below the front portion 7a or the slope portion 7c of the rear floor 7, and a rear portion of the power unit 4 is suspended below the rear portion 7b on the high level of the rear floor 7. The slope portion 7c of the rear floor 7 in the vehicle front-back direction is shorter than the flat front portion 7a and rear portion 7b, and has bent portions at front and rear. Thus, the slope portion 7c has higher rigidity than other portions, and can reduce transmission of sound emitted from the motor 2 and sound emitted from a protrusion of an electrode portion through the rear floor 7.

An opening (not shown) for operating a motor electrode terminal mounting portion, described later, is provided in the rear portion 7b of the rear floor 7 above the motor 2. The opening has a size and a shape that do not affect operability of connection and removal of the high voltage cable or the like or rigidity of the rear floor 7.

As shown in FIGS. 1 to 5, the sub-frame 8 in this embodiment includes a pair of left and right side frames (frame side portions) 9 and 10 extending in the vehicle front-back direction, and a pair of front and rear cross frames (frame front and rear portions) 11 and 12 extending in the vehicle width direction to connect between the side frames 9 and 10. The sub-frame 8 has a closed shape such that the frames surround the power unit 4.

The front cross frame 11 is disposed over the front portion of the power unit 4 in a front view of the vehicle and disposed in parallel with the shaft C of the motor 2. The side frames 9 and 10 are disposed over a side portion of the power unit 4 in a side view of the vehicle.

The rear cross frame 12 is raised upward, and it is disposed in an upper part of the vehicle with respect to the front cross frame 11 and the side frames 9 and 10. The rear cross frame 12 includes an inclined portion 12a extending upward in the vehicle, and a suspension portion 12b suspended from the rear floor 7 in the vehicle body. Thus, the sub-frame 8 generally has a substantially L-shape in a side view of the vehicle, and an intermediate portion in the vehicle front-back direction has a deformable bent portion of a substantially L-shape. Also, the sub-frame 8 of the substantially L-shape in a side view of the vehicle and the stepped rear floor 7 form a rectangular shape in a side view of the vehicle.

Furthermore, in the side frames 9 and 10, a motor-side mount bracket, described later, is disposed on the inclined portion 12a of the rear cross frame 12 extending upward from the side frame 10 on the right in the vehicle, or on the side frame 10 on the right in the vehicle, and disposed over the electrode wire portion of the motor 2 in a side view of the vehicle.

As shown in FIGS. 1 to 5, left and right side portions of the power unit 4 in this embodiment are suspended from the rear floor 7 of the vehicle body via suspension brackets 13 and 14 provided on the side frames 9 and 10 of the sub-frame 8, circular mount rubbers 15 and 16 each having a center disposed on an extending line of the shaft C of the motor 2, and motor-side mount brackets 17 and 18. The motor-side mount brackets 17 and 18 include main body portions 17a and 18a having bifurcated portions on the side of the motor speed reducer 3 and the motor 2 and mounted on two positions on the side portions of the motor speed reducer 3 and the motor 2, and suspension portions 17b and 18b extending in the vehicle front-back direction and suspended from the side frames 9 and 10.

Figure 2:
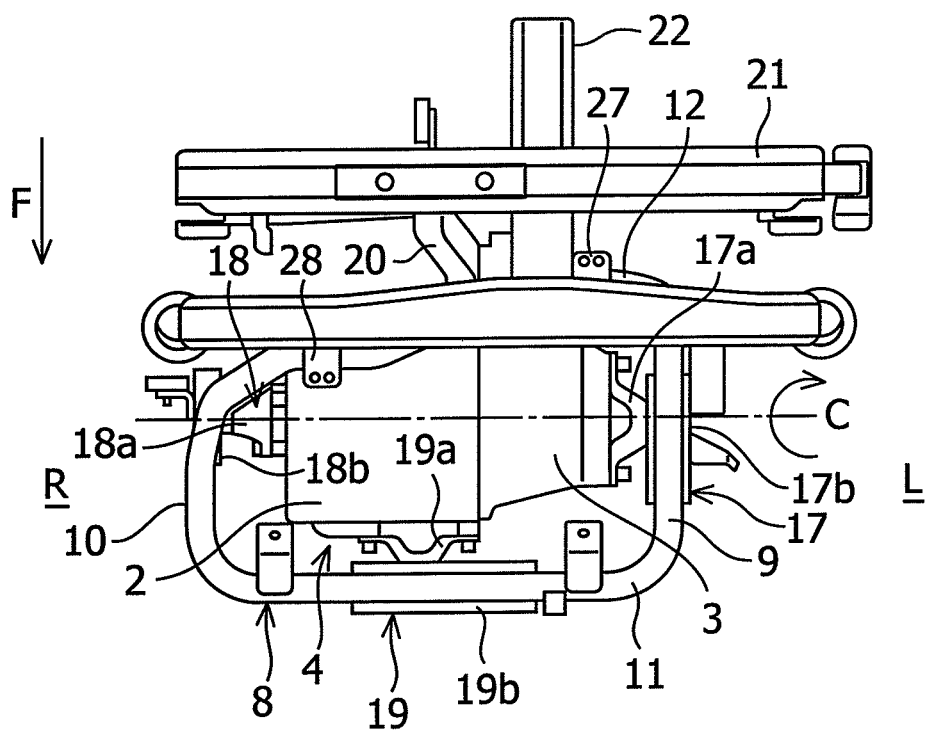
FIG. 2 is a plan view of the state in which the power unit is suspended in FIG. 1 seen from above the vehicle.

The center of the power unit 4 in the vehicle width direction on the vehicle front side of the power unit 4 is suspended from the front cross frame 11 of the sub-frame 8 at the same height position as the center of the shaft C of the motor 2. As shown in FIGS. 1, 2, and 4, a motor-side front mount bracket 19 supported by the front cross frame 11 is provided in a front portion of the motor 2. The motor-side front mount bracket 19 includes a main body portion 19a having a bifurcated portion on the side of the motor 2 and mounted on two positions on the front portion of the motor 2, and a suspension portion 19b extending in the vehicle width direction and suspended from the front cross frame 11.

Figure 3:
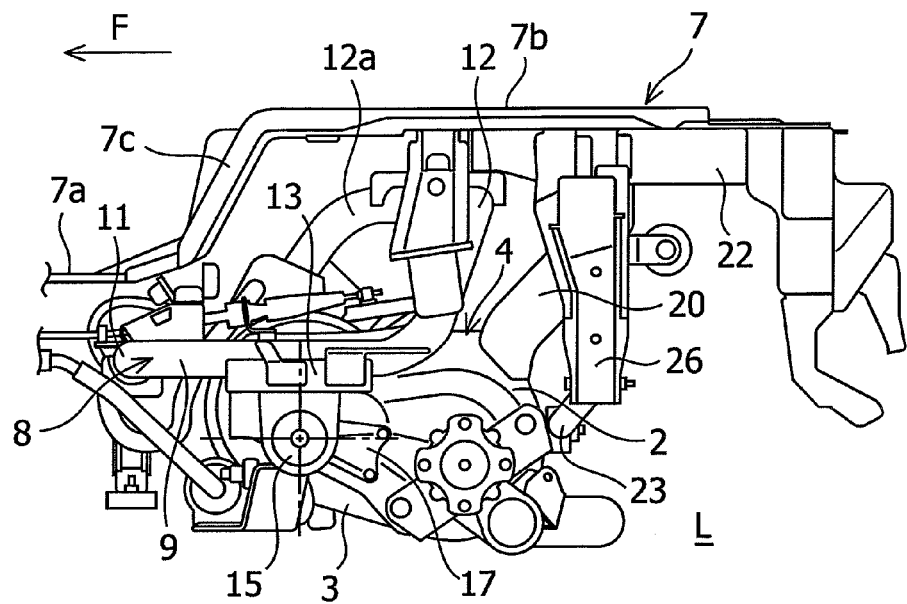
FIG. 3 is a side view of the state in which the power unit is suspended in FIG. 1 seen from left of the vehicle.
Figure 4:
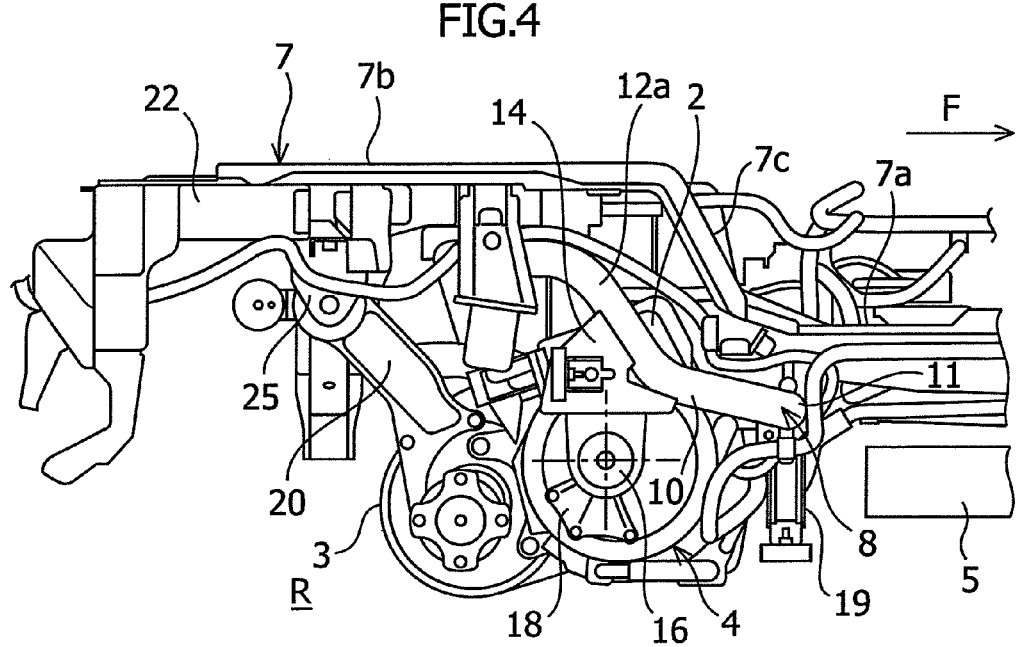
FIG. 4 is a side view of the state in which the power unit is suspended in FIG. 1 seen from right of the vehicle.
Figure 5:
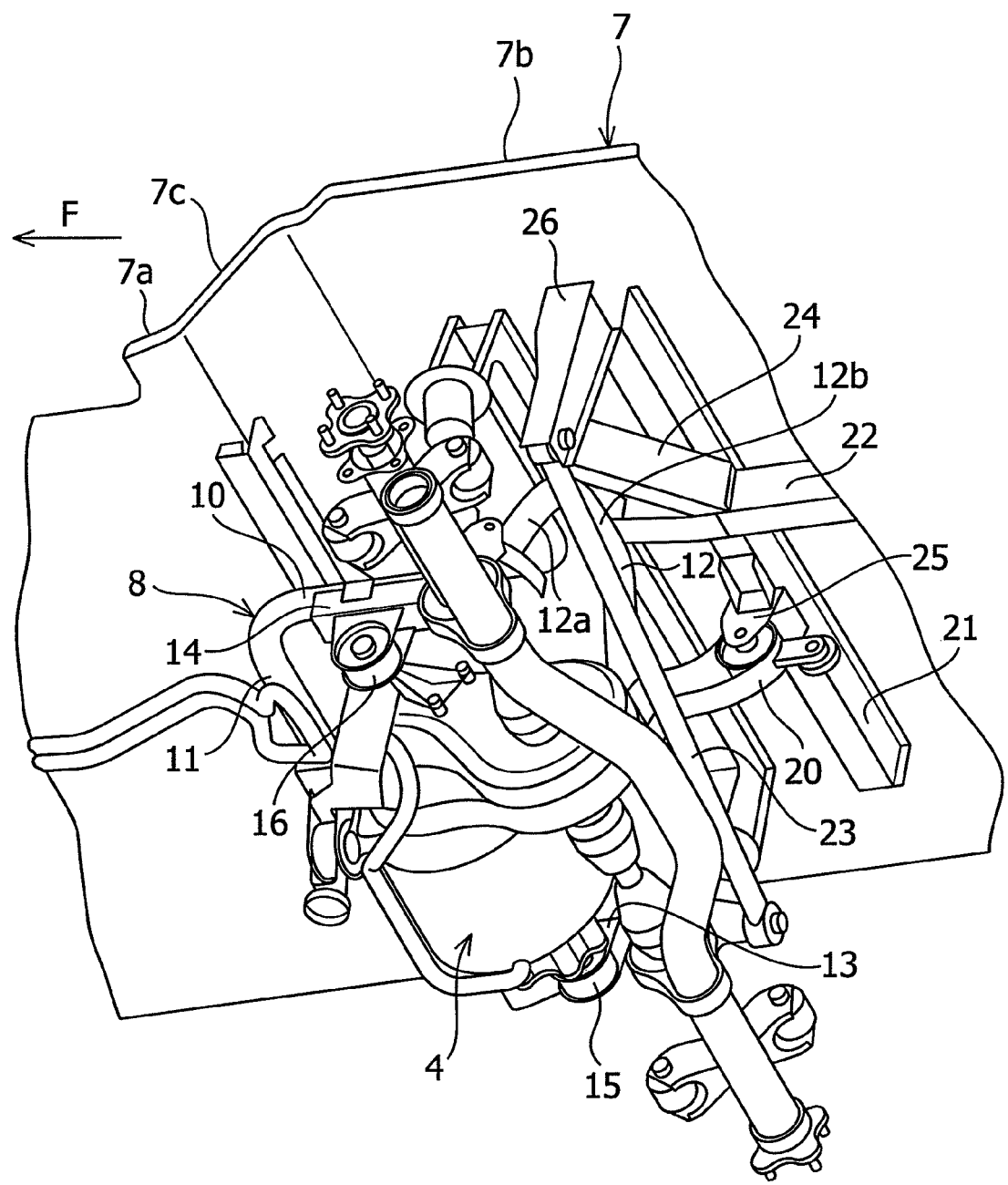
FIG. 5 is a perspective view of the state in which the power unit is suspended in FIG. 1 seen from obliquely below from a vehicle rear side.

Furthermore, as shown in FIGS. 3 to 5, the vehicle rear side of the power unit 4 is not mounted on the sub-frame 8, but is suspended via a longitudinal bracket 20 from the rear floor 7 of the vehicle body in the rear part of the vehicle with respect to the rear cross frame 12 of the sub-frame 8. Furthermore, a mounting bracket 25 is provided in a vehicle body suspension portion on the vehicle rear side of the power unit 4, close to a connecting portion of a support member 24 of a lateral rod 23 near a crossing portion of a first reinforcing member 21 extending in the vehicle width direction and a second reinforcing member 22 extending in the vehicle front-back direction.

The longitudinal bracket 20 extends in the vehicle front-back direction and is obliquely raised rearward of the vehicle. A base end of the bracket 20 is mounted to the rear portion of the power unit 4, and a front end thereof is supported by the mounting bracket 25. The mounting bracket 25 has an opening formed to have a substantially U-shaped downward section for installation of the front end of the longitudinal bracket 20, and secured to a lower surface of the first reinforcing member 21.

The first reinforcing member 21 and the second reinforcing member 22 are joined to the lower surface of the rear floor 7. The lateral rod 23 is disposed in the vehicle width direction between the vehicle body and an axle (not shown) to support lateral reaction of wheels. One end of the lateral rod 23 is rotatably supported by a lower end of a support bracket 26 extending downward of the vehicle from the lower surface of the rear floor 7, and the other end is rotatably supported by an axle (not shown).

Meanwhile, as shown in FIG. 2, there are two or more vehicle body suspension points 27 and 28 on the rear cross frame 12 in the rear portion of the sub-frame 8 in the vehicle width direction with the center of the power unit 4 therebetween in this embodiment, and at least two of the vehicle body suspension points 27 and 28 are offset in the vehicle front-back direction. Also, the vehicle body suspension point 27 on the side with the support member 24 of the lateral rod 23 is disposed in the rear part of the vehicle with respect to the vehicle body suspension point 28 on the opposite side. One, with the support member 24 of the lateral rod 23, of left and right L-shaped vertical portions near the inclined portion 12a of the rear cross frame 12 of the sub-frame 8 is disposed in the rear part of the vehicle.

As such, in the power unit suspension structure for the electric vehicle 1 according to the embodiment of the present invention, the front cross frame 11 of the sub-frame 8 is disposed over the front portion of the power unit 4 in a front view of the vehicle and is disposed in parallel with the shaft C of the motor 2. The side frames 9 and 10 of the sub-frame 8 are disposed over the side portion of the power unit 4 in a side view of the vehicle, the left and right side portions of the power unit 4 are suspended from the rear floor 7 via the suspension brackets 13 and 14 provided on the side frames 9 and 10 of the sub-frame 8, the circular mount rubbers 15 and 16 each having the center disposed on the extending line of the shaft C of the motor 2, and the motor-side mount brackets 17 and 18. This reduces contact between the power unit 4 and the structure in the front part of the vehicle, allows loads to the power unit 4 generated in all directions of the vehicle when running to be suspended at the left and right suspension portions with the shaft C of the motor 2 therebetween, and received by the side frames 9 and 10 of the sub-frame 8 extending near the power unit 4.

Furthermore, in the suspension structure of this embodiment, the rotating load or the like around the shaft C generated during driving or deceleration of the motor 2, or the impact load to the vehicle in the front-back direction can be efficiently absorbed by elastic deformation of the circular mount rubbers 15 and 16, or the like.

Thus, according to the suspension structure of this embodiment, propagation of vibration to the vehicle body due to vibration of the power unit 4 can be reduced to improve interior comfort of the vehicle. Also, breakage of the circular mount rubbers 15 and 16 can be prevented, increasing durability and life of the circular mount rubbers 15 and 16.

Also, in the power unit suspension structure of this embodiment, the motor-side mount bracket 18 is disposed on the inclined portion 12a of the rear cross frame 12, extending upward from the side frame 10 on the right side in the vehicle, or on the side frame 10 on the right side of the vehicle, and disposed over the electrode wire portion of the motor 2 in a side view of the vehicle. This can prevent direct contact between the structure in the side part of the vehicle and the power unit 4 even when a lateral impact load is applied to the vehicle, and reduce breakage of the high voltage cable of the motor 2 and the motor electrode terminal. Also, the sub-frame 8 of the substantially L-shape in a side view of the vehicle and the stepped rear floor 7 form a rectangular shape in a side view of the vehicle, thereby increasing rigidity of the suspension portion of the power unit 4.

Furthermore, in the suspension structure of this embodiment, the center of the power unit 4 in the vehicle width direction on the vehicle front side is suspended from the front cross frame 11 of the sub-frame 8 at the same height position as the center of the shaft C of the motor 2, and only the vehicle rear side of the power unit 4 is suspended via the longitudinal bracket 20 from the vehicle body in the rear part of the vehicle with respect to the rear cross frame 12, and suspended via the mounting bracket 25 close to the connecting portion of the support member 24 of the lateral rod 23 near the crossing point of the first reinforcing member 21 and the second reinforcing member 22. This can efficiently absorb an oscillation load, generated during driving or deceleration, of the motor 2, and rigidity of the vehicle body can prevent large oscillation of the power unit 4. Furthermore, in the suspension structure of this embodiment, there are two or more vehicle body suspension points 27 and 28 on the rear cross frame 12 in the vehicle width direction with the center of the power unit 4 therebetween and offset in the vehicle front-back direction. The vehicle body suspension point 27 on the side with the support member 24 of the lateral rod 23 is disposed in the rear part of the vehicle. The L-shaped vertical portion of the support member 24 near the inclined portion 12a of the rear cross frame 12 is disposed in the rear part of the vehicle. Thus, when an impact load is applied to the vehicle from the rear, the load is first applied to the portion on the side opposite to the high voltage terminal of the motor 2, thereby delaying movement of the high voltage terminal forward of the vehicle, reducing contact between the high voltage terminal and the component in front of the high voltage terminal, and reducing breakage of the high voltage terminal.

The embodiment of the present invention has been described above, but the present invention is not limited to the embodiment, and various modifications or changes may be made based on the technical concept of the present invention.

What is claimed is:

1. A power unit suspension structure for an electric vehicle in which a power unit including a motor and a motor speed reducer is mounted in a rear part of the vehicle, a shaft shared by the motor and the motor speed reducer is disposed in a vehicle width direction, and a frame for suspending the power unit from a vehicle body is provided around the power unit, wherein a front portion of the frame extending in the vehicle width direction is disposed overlapping a front portion of the power unit in a front view of the vehicle and disposed in parallel with the shaft of the motor, a side portion of the frame extending in a vehicle front-back direction is disposed overlapping a side portion of the power unit in a side view of the vehicle, wherein left and right side portions of the power unit are suspended from the vehicle body via a suspension bracket provided on the side portion of the frame, a circular mount rubber having a center on an extending line of the shaft of the motor, and a motor-side mount bracket, wherein a rear portion of the frame extending in the vehicle width direction is disposed in an upper part of the vehicle with respect to the front portion and the side portion of the frame, and includes an inclined portion extending upward of the vehicle, and a suspension portion suspended from the vehicle body, wherein a rear floor around the power unit has a front portion, a rear portion higher than the front portion, and a slope portion provided between the front portion and the rear portion and extending upward toward the rear part of the vehicle, and the front portion of the power unit is suspended from the front portion or the slope portion of the rear floor, and the slope portion in the vehicle front-back direction is shorter than the front portion and the rear portion and has bent portions at front and rear, wherein a center of the power unit in the vehicle width direction on a vehicle front side of the power unit is suspended from the front portion of the frame at the same height position as a center of the shaft of the motor, and a vehicle rear side of the power unit is suspended via a longitudinal bracket from the vehicle body in the rear part of the vehicle with respect to the frame, wherein a mounting bracket is provided in a vehicle body suspension portion on the vehicle rear side of the power unit, in a connecting portion of a support member of a lateral rod in a crossing portion of a first reinforcing member extending in the vehicle width direction and a second reinforcing member extending in the vehicle front-back direction, and wherein there are at least two vehicle body suspension points on the rear portion of the frame in the vehicle width direction with the center of the power unit therebetween, at least two of the vehicle body suspension points are offset in the vehicle front-back direction, the point on the side with the support member of the lateral rod is located in the rear part of the vehicle, and one, with the support member of the lateral rod, of left and right L-shaped vertical portions located in the inclined portion in the rear portion of the frame is disposed in the rear part of the vehicle, and wherein the support member is suspended between a support bracket extending downward of the vehicle from a lower surface of the rear floor and the second reinforcing member.

2. The power unit suspension structure for an electric vehicle according to claim 1, wherein the motor-side mount bracket is disposed on the inclined portion in the rear portion of the frame, extending upward of the vehicle from one side of the frame, or on one side portion of the frame, and is disposed overlapping an electrode wire portion of the motor in a side view of the vehicle.

* * * * *